United States Patent [19]

Mizutani et al.

[11] Patent Number: 6,032,935
[45] Date of Patent: Mar. 7, 2000

[54] LIQUID ENCLOSING TYPE VIBRATION ISOLATING MOUNT

[75] Inventors: Yutaka Mizutani; Motoo Kunihiro, both of Osaka; Yuuichi Sakabe, Aichi, all of Japan

[73] Assignee: Toyo Tire & Rubber Co., Ltd., Osaka, Japan

[21] Appl. No.: 08/894,114

[22] PCT Filed: Dec. 19, 1996

[86] PCT No.: PCT/JP96/03719

§ 371 Date: Oct. 21, 1997

§ 102(e) Date: Oct. 21, 1997

[30] Foreign Application Priority Data

Jun. 6, 1996 [JP] Japan ................................ 8-144193
Aug. 9, 1996 [JP] Japan ................................ 8-210911

[51] Int. Cl.$^7$ .............................. F16F 5/00; B60G 13/00
[52] U.S. Cl. ........................................ 267/140.11; 267/219
[58] Field of Search .................. 267/140.11, 140.12, 267/140.13, 153, 219, 141, 140.3; 248/562

[56] References Cited

U.S. PATENT DOCUMENTS

| | | | |
|---|---|---|---|
| 4,621,795 | 11/1986 | Eberhard et al. | 267/8 R |
| 4,739,962 | 4/1988 | Morita et al. | 248/562 |
| 4,815,720 | 3/1989 | Vanessi | 267/140.1 |
| 4,858,879 | 8/1989 | Miyamoto et al. | 248/562 |
| 5,178,374 | 1/1993 | Maeno | 267/140.13 |
| 5,240,233 | 8/1993 | Kato et al. | 267/140.13 |
| 5,273,262 | 12/1993 | Baldini et al. | 267/140.13 |

FOREIGN PATENT DOCUMENTS

| | | |
|---|---|---|
| 42910 | 1/1982 | European Pat. Off. . |
| 61-65933 | 4/1986 | Japan . |
| 1-65955 | 4/1989 | Japan . |
| 2-119540 | 9/1990 | Japan . |

*Primary Examiner*—Mark T. Le
*Assistant Examiner*—Jeffrey Woller
*Attorney, Agent, or Firm*—Jordan and Hamburg LLP

[57] ABSTRACT

The present invention provides a liquid enclosing type vibration isolating mount comprising a vibration isolating base member 16, a diaphragm 20 and a partition member 22 for vertically dividing a space between the former two into upper and lower liquid chambers 24 and 26. The partition member 22 is made of a press worked metal plate which is held in contact with the periphery of the diaphragm 20 to provide an orifice path 28 for establishing communication between the liquid chambers 24 and 26. The vibration isolating mount of the present invention has the following advantages: The partition member 22 is made of a press worked metal plate so that the manufacturing cost can be saved; since the periphery of the diaphragm 20 is used as a part of the wall of the orifice path 28, the axial length of the mount can be shortened and the shape of the mount is simplified; and the pressing process of the partition member 22 is facilitated.

8 Claims, 14 Drawing Sheets

LIQUID ENCLOSING TYPE VIBRATION ISOLATING MOUNT

TECHNICAL FIELD OF THE INVENTION

The present invention relates to a liquid enclosing type vibration isolating mount to be used for supporting a vibration generating body such as an automobile engine in a vibration isolating manner.

BACKGROUND OF THE INVENTION

As liquid enclosing type vibration isolating mounts for supporting a vibration generating body such as an automobile engine, there have conventionally been proposed various kinds of structures.

For example, there is shown in FIG. 14 a two chamber liquid enclosing type vibration isolating mount 150 which is constructed such that a cylindrical metal 152 and a fixing metal 159 are connected by a vibration isolating base member 153 made of elastic rubber, a diaphragm 154 made of a rubber membrane and a partition member 155 located inside the former are sealably fixed to the open end of the cylindrical metal 152 opposing to the vibration isolating base member 153 and an inner space between the vibration isolating base member 153 and the diaphragm 154 is divided into two liquid chambers 157 and 158 communicating with each other through an orifice path 156 whereby the vibration damping function and the vibration insulating function can be performed by the liquid flow effect by the orifice path 156 and the vibration isolating effect by the vibration isolating base member 153. Note that reference numeral 151 designates a cylindrical base metal for holding the cylindrical metal 152 therewithin and in some case both metals 151 and 152 are formed integral with each other.

Conventionally, it has been usual that the partition member 155 of the above-described vibration isolating mount 150 is either a molded aluminum, a molded synthetic resin or a product of machining of metal, and the orifice path 156 is in the form of an annular groove 160 provided on the outer peripheral surface of the partition member 155.

However, where the partition member 155 is a molded goods or a product of machining of metal, there arises the problem that the manufacturing cost is high.

Therefore, a first object of the present invention is to reduce the cost of manufacturing the above-mentioned two chamber liquid enclosing type vibration isolating mount.

Now, where the vibration isolating mount 150 of the above-described structure is used to support an automobile engine, the upper fixing metal 159 is usually fastened to the engine-side bracket.

In using the above vibration isolating mount 150, the vibration isolating base member 153 flexes by load of the engine or the like. When the vibration isolating base member 153 is fixed to the cylindrical metal 152 keeping a required space from the partition member 155 as described above, the vibration isolating base member 153 flexes and deforms within the entire inner portion of the cylindrical metal 152. Consequently, the amount of deflection of the vibration isolating base member 153 at the time of receiving the above-mentioned load increases resulting in increasing the amount of creeping thereof due to the deflective deformation by that degree so that the vibration isolating base member 153 can not have a sufficient degree of durability.

Further, in the vibration isolating mount of the above type, each of the upper fixing metal 159 and the basic metal 151 fixed to the frame of the chassis are provided with a stopper.

When the amount of displacement due to vibration is large the stoppers come into contact with each other so as to prevent the vibration isolating mount from displacing up and down largely due to the vibration of the engine or the like.

For example, in the case of FIG. 14, the upper fixing metal 159 is provided at a part thereof with a projection 159a covered with the vibration isolating base member 153, and an inner end 151a of an upward extension of the base metal 151 is formed to serve as a stopper with which the above-mentioned projection 159a comes into elastic contact (usually a clearance is kept therebetween) when the amount of upward displacement of the mount due to vibration is large, where by a further displacement of the mount is controlled.

Usually, such vibration isolating mount is made to have a substantially constant stopper clearance with respect to a certain load in proportion to the static spring constant of the vibration isolating base member but where an automobile engine or the like is supported by a plurality of mounts, the parts of the engine load allotted to the mounts differ depending on the points of use of the mounts and due to this nonuniformity of the allotted amounts of the load, the stopper clearance for each mount becomes nonuniform resulting in the generation of hammering sounds.

However, to increase the static spring constant of the rubber member forming the vibration isolating base member results in increasing the dynamic constant thereof at the same time so that the spring characteristic deviates to a great degree with an unfavorable result of failing to obtain an expected vibration isolating effect.

Therefore, a second object of the present invention resides in that in the above-described two chamber liquid enclosing type vibration isolating mount, the static spring constant of the vibration isolating elastic base member can be made to increase without increasing the dynamic spring constant, the deflective deformation of the vibration isolating base member, especially the downward deflective deformation, is reduced to thereby reduce the amount of creeping due to such deflective deformation so that the durability of the mount is enhanced and the stopper clearance is less affected by the deformation.

On the other hand, there is the problem that when the partition member 155 is made of a rigid material only as in the case of the vibration isolating mount 150, the dynamic constant is generally high and the noise transmissivity is also high so that the interior sounds such as muffled sound or transmitting sound go high.

In order to solve this problem, as shown in FIG. 15, it is contemplated to provide a rubber membrane 162 at the center of the partition member 155. Where such rubber membrane 162 is provided, there is a dynamic spring constant reducing effect in a frequency domain of about 100–300 Hz when compared to the use of the partition member made of the rigid material only. However, since the thickness of the rubber membrane 162 is constant in the radial direction, the dynamic constant around a frequency of 350 Hz becomes high so that it is not possible to reduce the dynamic spring constant in a high frequency domain over a wide range of 100–500 Hz.

Therefore, a third object of the present invention resides in that in the two chamber liquid enclosing type vibration isolating mount, the dynamic spring constant is reduced in a high frequency domain over a wide range of 100–500 Hz to thereby reduce the generation of muffled sound or transmitting sound.

DISCLOSURE OF THE INVENTION

A first aspect of the present invention for achieving the above-mentioned first object is characterized in that in a two chamber liquid enclosing type vibration isolating mount comprising, in a sealed state, a cylindrical metal, a fixing metal, a vibration isolating base member made of rubber and coupling the cylindrical metal and the fixing metal, a diaphragm made of a rubber membrane and arranged at an opening of the cylindrical metal opposing the vibration isolating base member and a partition member arranged inside the diaphragm and dividing a space between the vibration isolating base member and the diaphragm into two liquid chambers communicating with each other through an orifice path, the partition member is made of a press worked metal plate and provides the orifice path in cooperation with the diaphragm by coming into contact with the periphery of the diaphragm so that the orifice path is formed along the outer periphery of the portion of contact between the partition member and the diaphragm.

According to this liquid enclosing type vibration isolating mount, the partition member is made of a press worked metal plate so that the manufacturing cost is saved. Further, the partition member forms the orifice path along the outer periphery of its contact portion with the diaphragm in cooperation with the diaphragm. That is, since the periphery of the diaphragm forms part of the wall of the orifice path, the axial length of the mount can be shortened by that wall part when compared to a case where the orifice path is formed by a groove provided along the conventional partition member and further, the shape of the mount is simplified to facilitate the pressing process therefor.

A preferred embodiment of this aspect of the invention is the provision of a sealing lip around the periphery of the diaphragm so as to seal the contact portion between the partition member and the diaphragm. Consequently, the leakage of a liquid from the orifice path can be prevented to thereby obtain a stabilized damping effect.

In the above case, it is possible from the practical point of view that the diaphragm be provided with an annular auxiliary metal along the periphery thereof and the partition member form the above-mentioned orifice path in cooperation with this auxiliary metal.

A second aspect of the present invention to achieve the above-described second object of the invention is characterized in that in a two chamber liquid enclosing type vibration isolating mount comprising, in a sealed state, a cylindrical metal, a fixing metal, a vibration isolating base member made of rubber and coupling the cylindrical metal and the fixing metal, a diaphragm made of a rubber membrane and arranged at an opening of the cylindrical metal opposing to the vibration isolating base member and dividing a space between the vibration isolating base member and the diaphragm into two liquid chambers communicating with each other through an orifice path, the peripheral portion of the inner surface of the vibration isolating base member is held in face-to-face contact with the surface of the peripheral portion of the partition member opposing to the vibration isolating member.

According to this liquid enclosing type vibration isolating mount, since the periphery of the vibration isolating base member is held in contact with the periphery of the partition member, the deflective deformation of the vibration isolating base member resulting from the supporting load such as an engine is controlled to increase the static spring constant. Consequently, it is possible to reduce the amount of creeping due to such deflective deformation and to improve the durability of the mount. Further, where a plurality of such mounts are used for supporting an automobile engine, even when the parts of the load allotted to the mounts differ among themselves, the differences among the stopper clearances of the mounts are small and the mounts are not affected much thereby. Therefore, the generation of hammering sounds can be prevented and the vibration of the engine can be controlled to thereby improve the driving stability of the engine.

Moreover, since the periphery of the vibration isolating base member is held in face-to-face contact with the periphery of the partition member without being bonded to the latter, the dynamic spring constant does not increase and it is possible to secure the vibration isolating characteristic same as that of the conventional mount.

A preferred embodiment of this aspect of the invention resides in that the annular auxiliary metal provided along the periphery of the diaphragm is fixed to the inner periphery of the opening of the cylindrical metal so as to bring it into pressure contact with the surface of the periphery of the partition member opposing to the diaphragm. With such a structure, the partition member is clamped between the auxiliary metal along the periphery of the diaphragm and the periphery of the vibration isolating base member so that the load on the vibration isolating base member can be more favorably supported by the contact portion of the periphery of the vibration isolating base member and the partition member so that the deflection control function of the mount can be further displayed.

In the above case, it is preferable that the auxiliary metal along the periphery of the diaphragm be fixed to the cylindrical metal together with the partition member by caulking the edge of the cylindrical metal whereby even when the cylindrical metal is a simple cylinder, the partition member is held at a predetermined position in a stabilized manner.

Further, this second aspect of the invention and the above-mentioned first aspect of the invention may be combined together. That is, in the vibration isolating mount according to this second aspect of the invention, the partition member may be formed by pressing a metal plate which comes into contact with the periphery of the diaphragm so that the above-mentioned orifice path is formed along the outer periphery of the contact portion in cooperation with the diaphragm.

A third aspect of the present invention for achieving the third object of the invention is characterized in that in a two chamber liquid enclosing type vibration isolating mount comprising, in a sealed state, a cylindrical metal, a fixing metal, a vibration isolating base member made of rubber and coupling the cylindrical metal and the fixing metal, a diaphragm made of a rubber membrane and arranged at an opening of the cylindrical metal opposing to the vibration isolating base member and a partition member arranged inside the diaphragm and dividing a space between the vibration isolating base member and the diaphragm into two liquid chambers communicating with each other through an orifice path, the partition member includes an annular rigid portion for forming the orifice path on the outer periphery thereof and a rubber membrane attached inside the rigid portion to define the above-mentioned two liquid chambers and the thickness of a portion close to the rubber membrane attached portion is made smaller than the thickness of the inner part thereof.

According to this liquid enclosing type vibration isolating mount, the rubber membrane of the partition member defining the two liquid chambers has, at a portion close to its attached portion to the rigid portion, a thickness smaller than the thickness of the inner peripheral side thereof so that the responsiveness of the rubber membrane to vibration is favorable and the dynamic spring constant can be lowered in a high frequency domain over a wide range of 100–500 Hz.

In this aspect of the invention, it is preferable that the rigid portion of the partition member be made of a press worked metal plate in view of reducing the manufacturing cost. Further, in that case, it is also preferable that the rigid portion of the partition member comes into contact with the periphery of the diaphragm to form the orifice path along the outer periphery of the contact portion, in cooperation with the diaphragm.

In addition, in this aspect of the invention, it is preferable that the rubber membrane be directly attached to the inner peripheral surface of the rigid portion of the partition member forming the orifice path. Thus, by directly attaching the rubber membrane to the inner peripheral surface of the rigid portion, a large area can be secured for the rubber membrane as compared to the case where the rigid portion for forming the orifice path is extended inwardly from the inner peripheral surface thereof and the rubber membrane is attached to this extension. Consequently, the responsiveness of the rubber membrane to vibration increases to thereby further reduce the dynamic spring constant in a high frequency domain.

BRIEF DESCRIPTION OF THE DRAWINGS

FIG. 6 is a sectional view of the partition member wherein FIG. 6(a) is a sectional view taken along the A—A line of FIG. 5, FIG. 6(b) is a sectional view taken along the B—B line of FIG. 5 and FIG. 6(c) is a sectional view taken along the C—C line of FIG. 5;

BEST MODES FOR CARRYING OUT THE INVENTION

Now, preferred embodiments of the present invention will be described with reference to the accompanying drawings.

Figure 1:
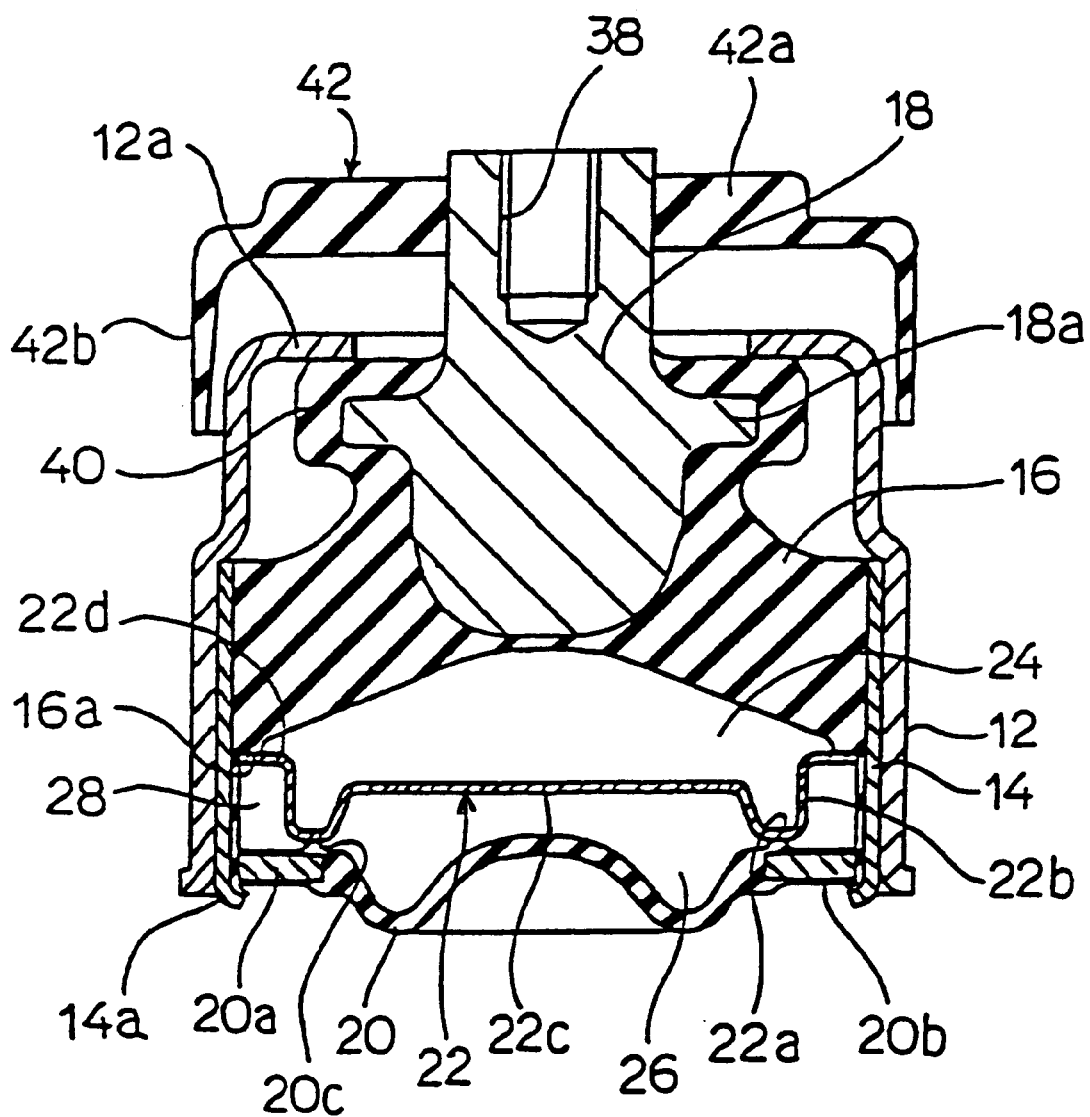
FIG. 1 is a vertical sectional view of a liquid enclosing type vibration isolating mount according to one embodiment of the present invention.

FIG. 1 shows a liquid enclosing type vibration isolating mount 10 which is a combination of the above-mentioned first and second aspects of the invention.

In the case of this vibration isolating mount 10, a vibration isolating base member 16 made of an elastic rubber member and bearing an automobile engine load is sealably and integrally bonded to an upper opening of a cylindrical metal 14 fitted in a cylindrical main metal 12 by vulcanization molding means and a fixing metal 18 is fixedly embedded in the upper portion of the vibration isolating base member 16.

Further, to a lower opening of the cylindrical metal 14 there are sealably attached a rubber diaphragm 20 and a partition member 22 so as to face the vibration isolating base member 16. In this way, an inner space between the vibration isolating base member 16 and the diaphragm 20 is divided by the partition member 22 into a first liquid chamber 24 and a second liquid chamber 26 and both chambers are held in communication with each other through an orifice path 28.

Figure 2:
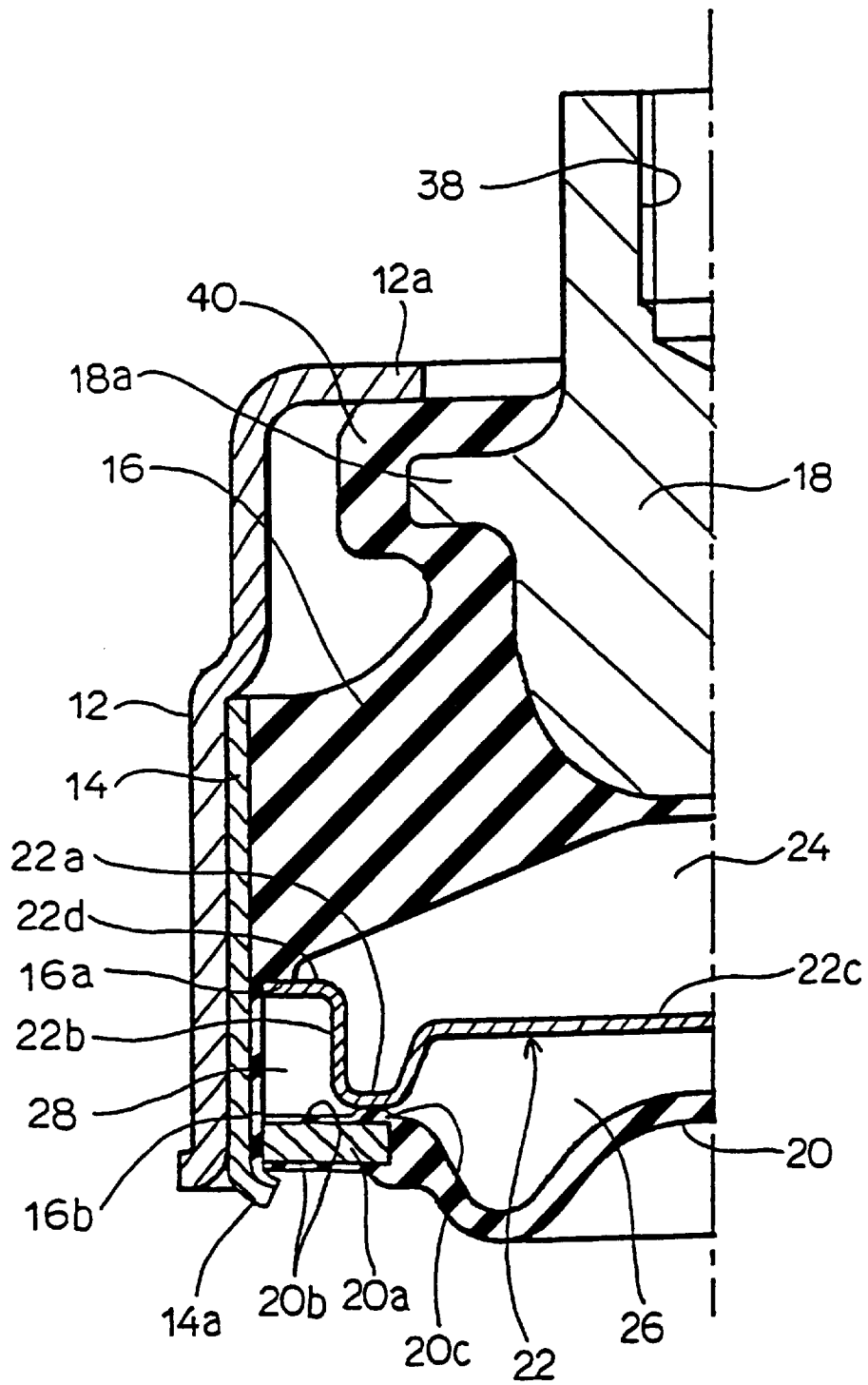
FIG. 2 is an enlarged sectional view of an essential portion of the mount of FIG. 1.

The diaphragm 20 is provided with an annular auxiliary metal 20a around the periphery thereof and this auxiliary metal 20a and the partition member 22 are fitted in the inner periphery of the lower opening of the cylindrical metal 14. Further, as shown in FIG. 2, the outer periphery of the diaphragm 20 is bifurcated to extend over the upper and lower surfaces of the auxiliary metal 20a as a rubber layers 20b so as to come into sealing contact with the partition member 22.

The partition member 22 is formed by press working or drawing of a metal plate such as a steel plate and is held in contact with the auxiliary metal 20a of the diaphragm 20 through rubber layers 20b thereby forming the above-mentioned orifice path 28 at the outer periphery of the contact portion in cooperation with the diaphragm 20. Further, the partition member 22 is in contact with the periphery of the vibration isolating base member 16 so that it is clamped between the diaphragm 20 and the vibration isolating base member 16.

More specifically, the partition member 22 includes a downwardly projecting annular contact portion 22a which is in contact with the above-mentioned auxiliary metal 20a, an orifice path forming portion 22b which is in the shape of inverted L in section and which forms the orifice path 28 together with the auxiliary metal 20a at the outer periphery of the contact portion 22a and a partition section 22c for defining both of the liquid chambers 24 and 26 inside the contact portion 22a.

Figure 4:
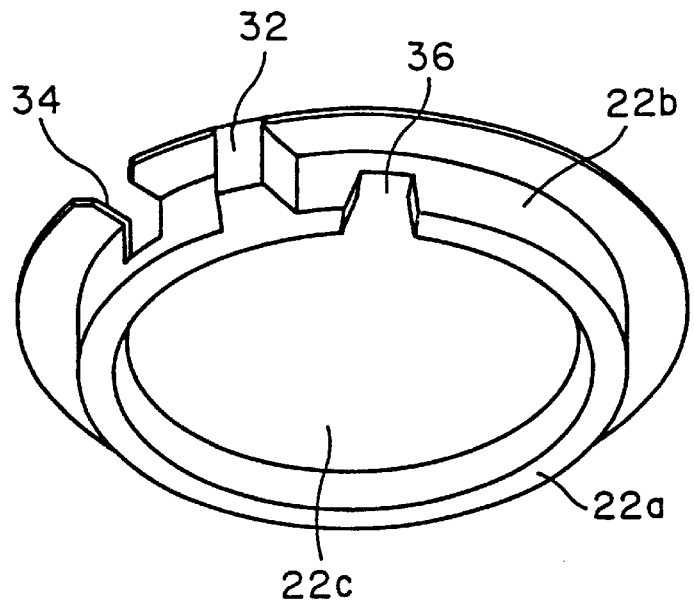
FIG. 4 is a perspective view of the partition member shown in FIG. 3.
Figure 5:
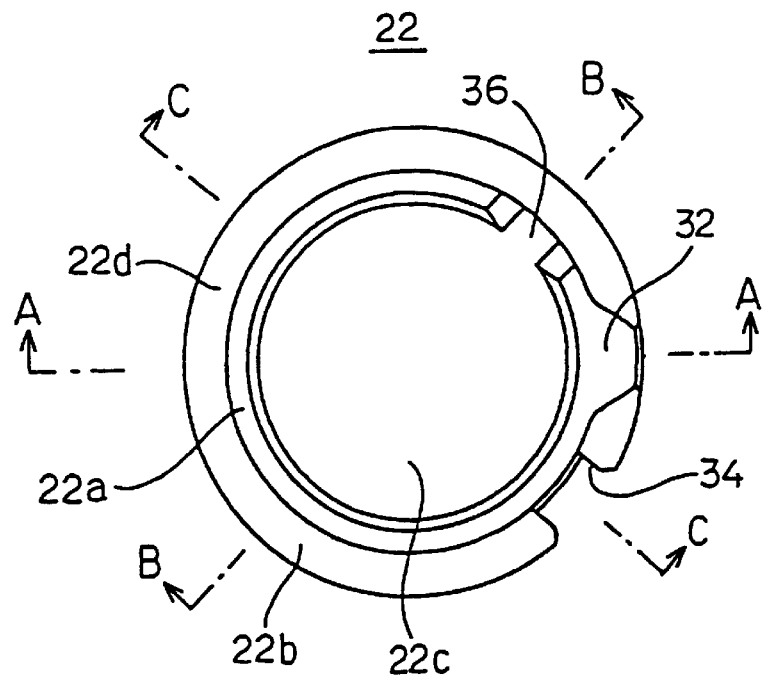
FIG. 5 is a plan view of the partition member.
Figure 6:
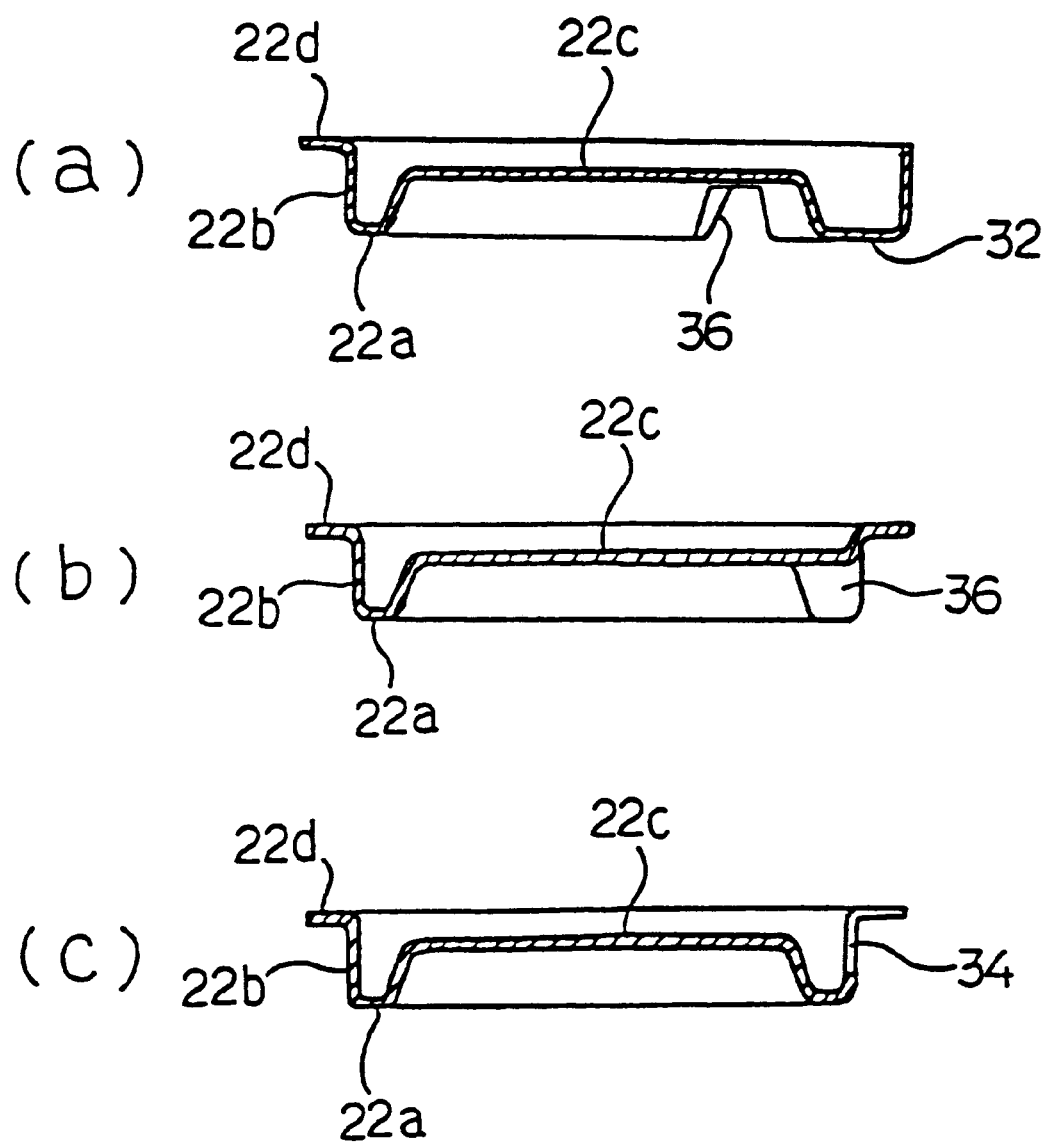

Further, as shown in FIGS. 4 through 6, a portion in view of the circumferential direction, of the orifice path forming portion 22b projects downward to thereby form a blocking portion 32 to block the orifice 28. Further, in proximity of one side of the blocking portion 32, there is provided a substantially rectangular first communication port 34 formed by drilling the orifice path forming portion 22b so as to open to the first liquid chamber 24. On the other hand, in proximity of other side of the blocking portion 32, there is provided a second communication port 36 formed by upwardly depressing the contact portion 22a so as to make it open to the second liquid chamber 26.

By the partition member 22 having the above structure, the orifice path 28 is defined by the outer peripheral surface of the orifice path forming portion 22b of the partition member 22, the upper surface of the auxiliary metal 20a of the diaphragm 20 and the inner peripheral surface of the cylindrical metal 14. The orifice path 28 allows the first and second liquid chambers 24 and 26 to communicate with each other through the two communication ports 34 and 36 on both sides of the blocking portion 32.

Figure 3:
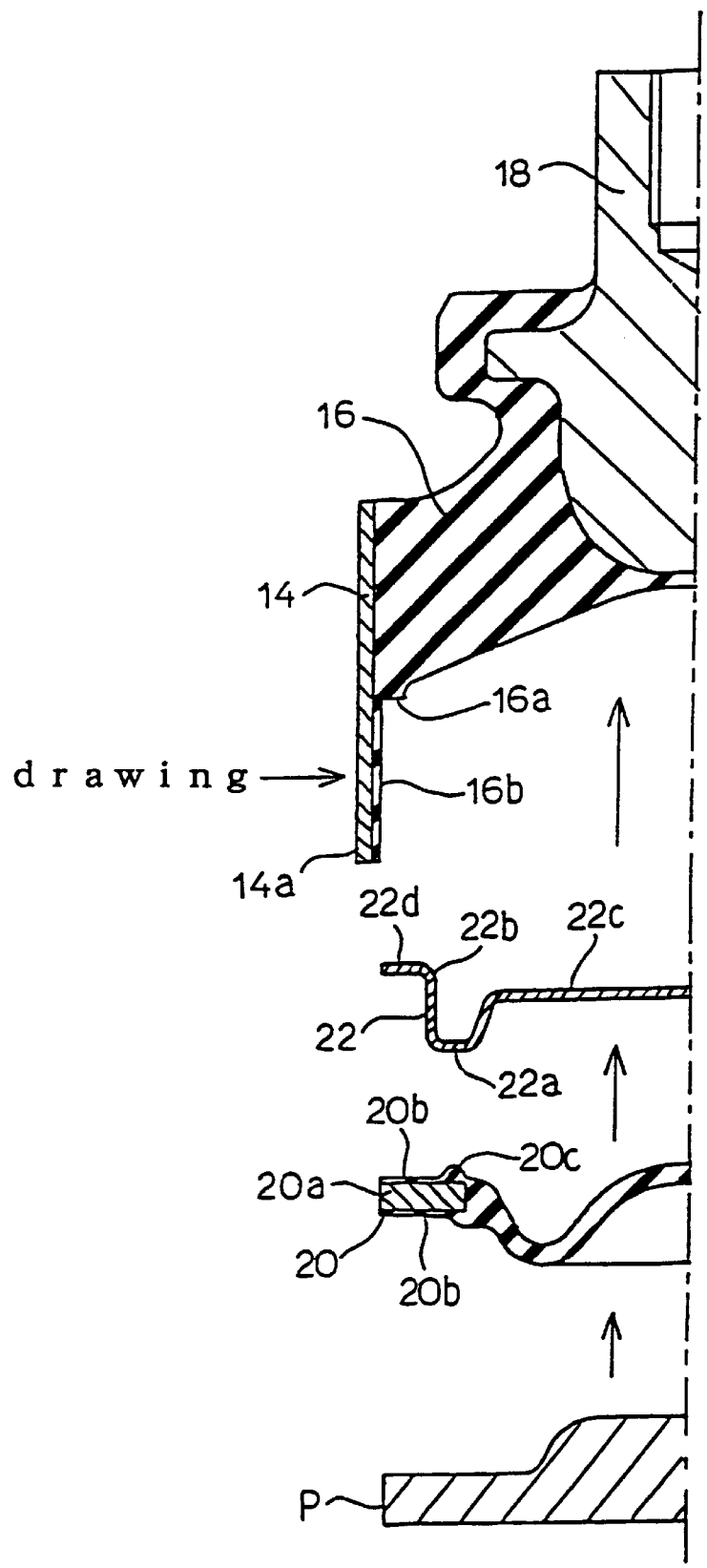
FIG. 3 is an exploded sectional view of an essential portion of the mount of FIG. 1 with the view being given for illustrating how a diaphragm and a partition member are fixed to a cylindrical metal forming part of the mount.

The attachment of the partition member 22 and the diaphragm 20 to the cylindrical metal 14 is performed such that as shown in FIG. 3, the partition member 22 and the diaphragm 20 are inserted into the cylindrical metal 14, to which the vibration isolating base member 16 is fixed, from the lower opening of the cylindrical metal 14 and the cylindrical metal 14 is drawn in the radial direction to thereby sealably fix both the metal 14 and the diaphragm 20. In this case, a pressure jig P, for pressure-fixing and positioning the partition member 22 and the diaphragm 20, is inserted into the lower opening of the cylindrical metal 14 from below and in that state, the above-mentioned drawing operation is performed. The pressure jig P is removed from the cylindrical metal 14 after the completion of the drawing operation. Then, as shown in FIG. 2, in order to prevent the slipping out of the partition member 22 and the diaphragm 20 from the cylindrical metal 14, the edge 14a of the metal 14 is subjected to a bending process. Further, at the portion where the partition member 22 and the auxiliary metal 20a of the diaphragm 20 are fitted to inner side of the cylindrical metal 14, there is provided a rubber sealing layer 16b which is integral with the vibration isolating base member 16, whereby the sealing of the fitted portion is maintained.

The rubber layer 20b of the diaphragm 20 over the auxiliary metal 20a is provided integrally with an annular sealing lip 20c which projects upward. This integral sealing lip 20c is so formed as to abut on substantially the center of the lower surface of the contact portion 22a of the partition member 22. By the pressure-bonding of the partition member 22 and the diaphragm 20 using the above-mentioned pressure jig P, the sealing lip 20c seals the contact portion between the partition member 22 and the diaphragm 20 by being pressed by the contact portion 22a.

As shown in FIG. 2, at the periphery of inner surface, i.e., the surface facing the first liquid chamber 24, of the vibration isolating base member 16, there is formed a stepped surface 16a which is substantially orthogonal to the axis of the mount 1. This stepped surface 16a is held in face-to-face contact with, but not bonded to, a stepped surface 22d of the periphery of the partition member 2.

The stepped surface 22d of the partition member 22 facing the stepped surface 16a of the vibration isolating member 16 is formed on the communication path forming portion 22b of the partition member 22. The stepped surface 22d is wider than the stepped surface 16a of the vibration isolating base member 16 and substantially orthogonal to the axis of the mount so that these stepped surfaces 22d and 16a are held in contact with each other without being bonded. A clearance is formed between the inner surface of the vibration isolating member 16 continuous with the stepped surface 16a and the stepped surface 22d of the partition member 22.

Thus, the deflective deformation of the vibration isolating member 16 toward the partition member 22 is limited by the contact portion between the stepped surfaces 22d and 16a.

It is noted that in FIG. 2, reference numeral 38 designates a screw-threaded hole provided in the upper end of the fixing metal 18 so as to receive a fixing bolt.

Further, reference numeral 40 designates a stopper projection serving as a stopper apparatus for the vibration isolating mount 10. The stopper projection 40 is formed by causing a portion of the fixing metal 18 to project outside in the form of a collar 18a which is covered with a rubber layer formed integral with the vibration isolating base member 16. At the same time, the upper end of the main metal 12 is extended upward and then bent inward at a position slightly above the stopper projection 40 so as to provide an inner peripheral end portion 12a. With this structure, when the amount of upward displacement of the fixing metal 18 due to vibration is large, the stopper projection 40 comes into elastic contact with the inner peripheral end portion 12a of the main metal 12 to thereby suppress further displacement of the fixing metal 18.

It is noted that in FIG. 2, the stopper projection 40 is in contact with the inner peripheral end portion 12a but in the ordinary condition of use, there is a certain clearance between them due to a load such as an engine being supported.

Reference numeral 42 in FIG. 1 designates a stopper serving as a cover fixed to the upper fixing metal 18. The stopper 42 functions such that when the fixing metal 18 displaces downward to a great degree, the central thick portion 42a thereof comes into elastic contact with the inner peripheral end 12a of the main metal 12 to thereby control the excessive rolling of the fixing metal 18.

It is noted that although not shown in the drawings, the main metal 12 may be provided with a fixing stay according to necessity and a cover member covering the outer side of the diaphragm 20 may be provided integral with the cylindrical metal 14 to form an air chamber outside of the diaphragm 20. Further, it is possible to omit the main metal 12 so that the cylindrical metal 14 serves the function of the main metal 12 at the same time.

The vibration isolating mount 10 of the above structure is used in such a manner that usually, either the main metal 12, into which the cylindrical metal 14 is fitted, or the fixing metal 18 is fixed to the side of vibration generating body. For example, the fixing metal 18 is fixed to a bracket for vibration generating body such as an automobile engine while the main metal 12 is fixed to the support such as the chassis of an automobile. In such a manner of use, by the effect of liquid flowing between the two liquid chambers 24 and 26 and by the vibration isolating effect by the vibration isolating base member 16, a vibration damping effect and a vibration isolation effect are displayed.

In the case of the vibration isolating mount according to the instant embodiment, since the partition member 22 is made of a press worked metal plate, the manufacturing cost is saved. Further, the partition member 22 forms the orifice path 28 in cooperation with the diaphragm 20, along the outer periphery of their contact portion between them. The diaphragm 20 forms part of the wall of the orifice path 28 so that this part of the wall, the diaphragm-side wall of the orifice path, which has been required in the conventional partition member structure can be dispensed with to thereby shorten the axial length of the mount. Further, since a surface of the diaphragm 20 is made use of as a part of the wall of the orifice path 28, the shape of the partition member is simplified and so the press working process thereof is facilitated.

In addition, the diaphragm 20 is provided at the periphery thereof with the sealing lip 20c to seal the contact portion with the partition member 22 so that the leakage of liquid from the orifice path 28 can be prevented to thereby obtain a stabilized damping effect.

Further, the vibration isolating base member 16 deflects and deforms due to a load such as an engine to be supported thereby but since the stepped surface 16a at the periphery of the inner surface of the vibration isolating base member 16 is in contact with the stepped surface 22d, facing the liquid chamber 24, of the periphery of the partition member 22, the downward deflective deformation of the vibration isolating base member is properly controlled at the periphery of the member 16 so that the static spring constant increases. That is, the amount of deflection of the vibration isolating base member 16 decreases and the amount of creeping due to the deflective deformation decreases.

For the above reason, where a plurality of vibration isolating mounts of the same kind and level are used to support an automobile engine, even when the parts of the engine load allotted to the mounts differ from one another depending on the points of their use, since the deflection of each of the mounts resulting from the engine load is controlled as described above, the differences among the stopper clearances of the mounts become small so that the setting of the stopper clearance of each mount is little affected and the generation of hammering sounds can be prevented.

In addition, since the stepped surface 16a of the vibration isolating base member 16 and the stepped surface 22a of the partition member 22 are held in contact with each other without being bonded together, the dynamic spring constant does not increase and the vibration isolating characteristics the same as those of the conventional mount can be secured.

Figure 7:
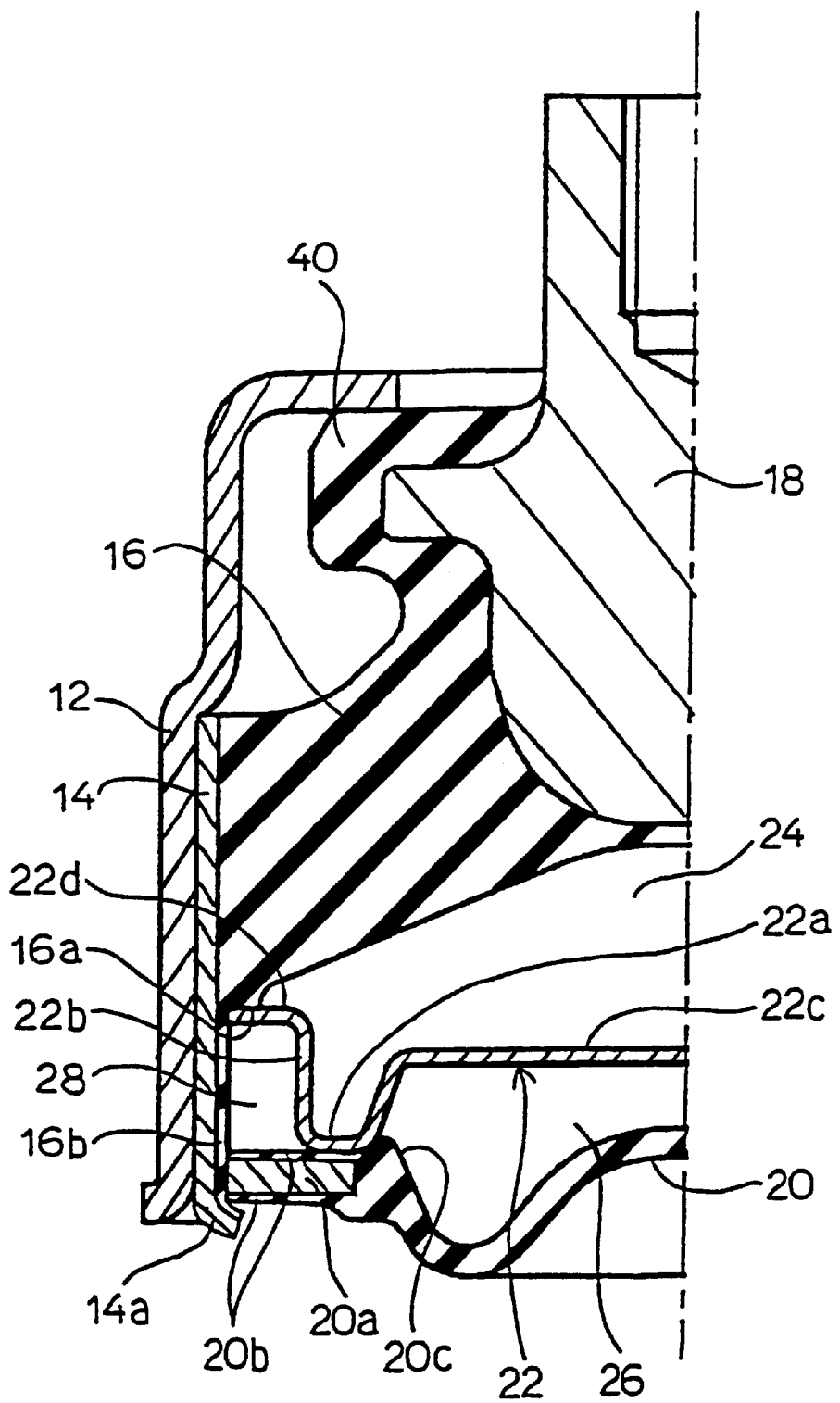
FIG. 7 is an enlarged partial vertical sectional view of a liquid enclosing type vibration isolating mount according to a second embodiment of the present invention.

FIG. 7 shows a liquid enclosing type vibration isolating mount 50 according to a second embodiment of the present invention. In the case of this vibration isolating mount 50, from the vibration isolating mount 10 according to the first embodiment of the present invention, the position of the sealing lip 20c provided at the periphery of the diaphragm 20 is changed. That is, in this embodiment, the sealing lip 20c is so arranged as to come into contact with the inner periphery of the lower surface of the contact portion 22a of the partition member 22. As in the previous embodiment, the sealing lip is pressed by the contact portion 22a to seal the contact portion with the partition member 22 thereby preventing the leakage of liquid from the orifice path 28.

Figure 8:
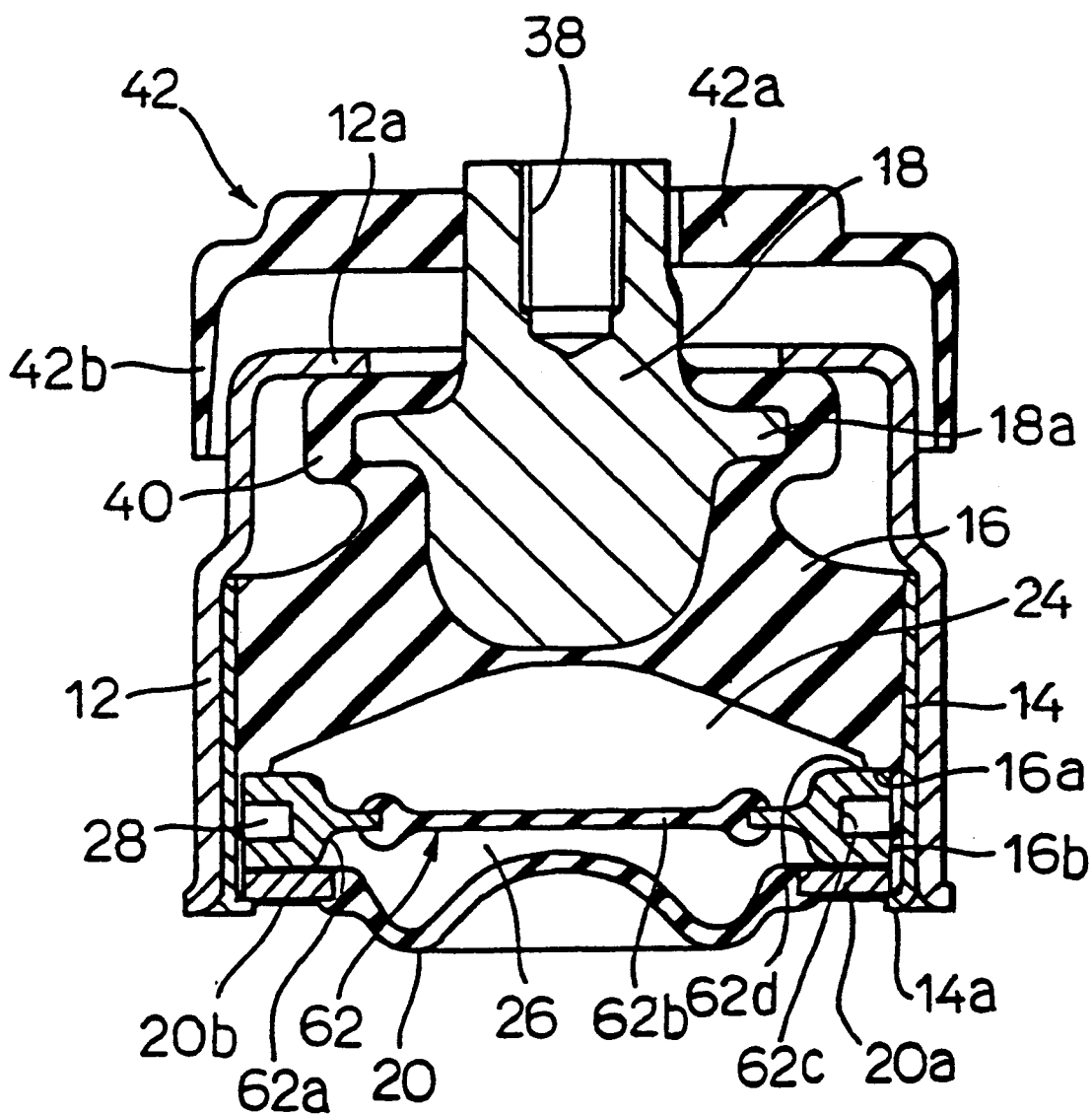
FIG. 8 is a vertical sectional view of a liquid enclosing type vibration isolating mount according to a third embodiment of the present invention.
Figure 9:
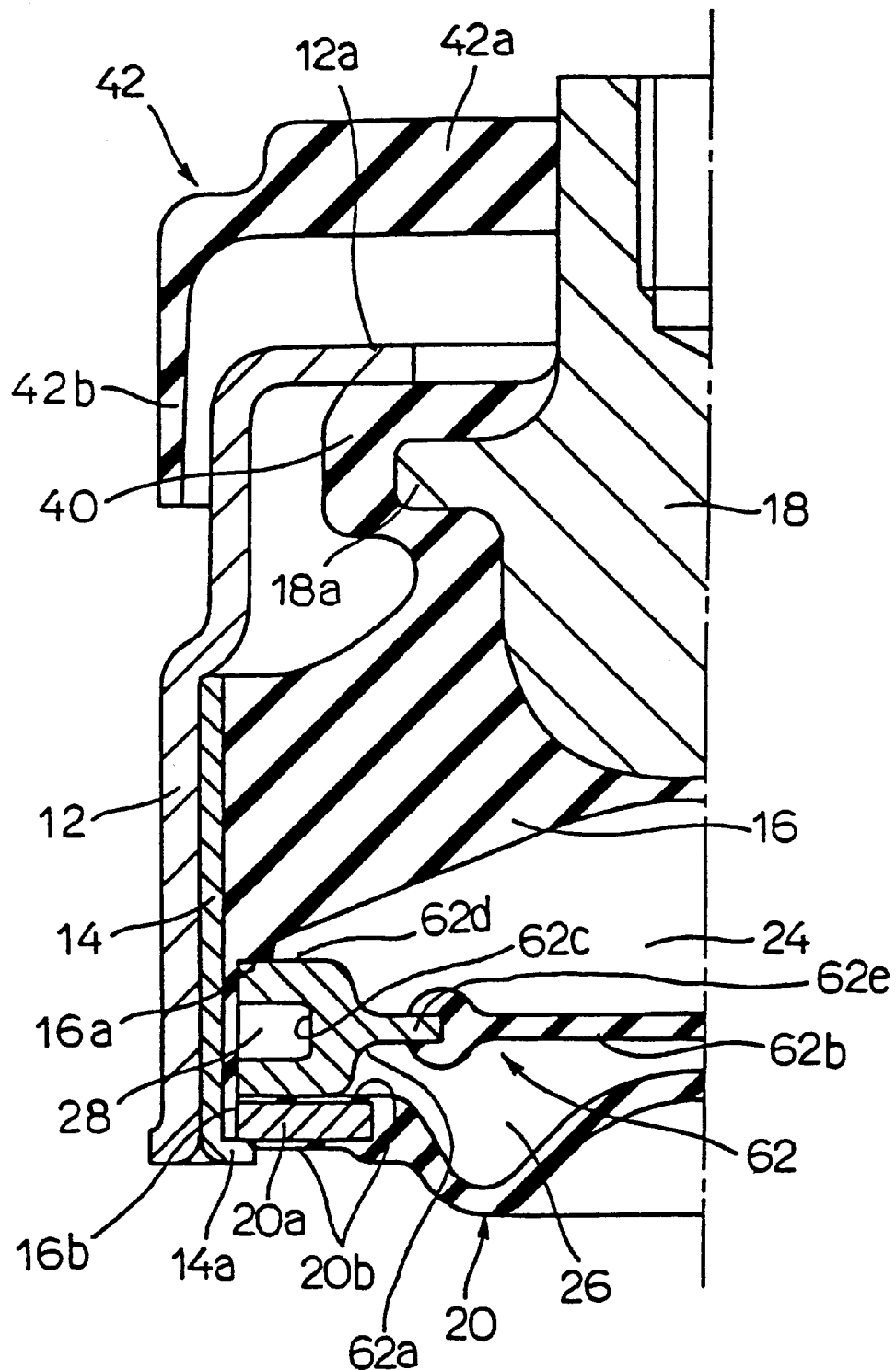
FIG. 9 is an enlarged partial sectional view of the liquid enclosing type vibration isolating mount shown in FIG. 8.

FIGS. 8 and 9 show a liquid enclosing type vibration isolating mount 60 according to a third embodiment of the present invention. This embodiment is related to the embodiment of the second aspect of the present invention. The difference between this embodiment and the above-mentioned first embodiment resides with the structure of a partition member 62 for dividing the space between the vibration isolating base member 26 and the diaphragm 20 into two liquid chambers 24 and 26. Accordingly, the structure of the partition member 62 will be described while the description of the structure of the other members is omitted. Note that in the drawings, like parts are designated by like reference numerals unless specified otherwise.

The partition member 62 comprises an annular rigid portion 62a providing the orifice path 28 along the outer periphery thereof and a rubber membrane 62b for defining the two liquid chambers 24 and 26 attached to the inside thereof and the central portion thereof is made elastically deformable to reduce the dynamic spring constant in a high frequency domain. The rigid portion 62a is a molded metal product and is provided on the outer periphery thereof with a groove 62c for defining the orifice path 28. The rigid portion 62a is also provided with an extension 62e extending radially and inwardly from the inner peripheral wall of the portion where the groove 62c is formed. To the extension 62e the rubber membrane 62b is attached. Reference numeral 62d designates a stepped surface of the partition member 62 which is in contact with, but not bonded to, the stepped surface 16a formed at the periphery of the inner surface of the vibration isolating base member 16. The stepped surface 62d has a larger width than the stepped surface 16a and is formed substantially orthogonal to the axis of the mount. Note that the communication ports leading to the liquid chambers 24 and 26 are omitted in the drawings.

According to this embodiment, the partition member 62 and the diaphragm 20 are arranged such that the rigid portion 62a of the partition member 62 and the auxiliary metal 20a of the diaphragm 20 are fitted into the opening of the cylindrical metal 14 and by caulking the edge 14a of the cylindrical metal 14, they are fixed to the metal 14 so as to become unable to slip out of the latter. For bringing the auxiliary metal 20a of the diaphragm 20 into pressure contact with the periphery of the partition member 62, either the method using the pressure jig P according to the first embodiment or the method of caulking the edge of the cylindrical metal 14 may be used.

Like the above-mentioned first embodiment, in the case of the vibration isolating mount 60 according to this embodiment, since the stepped surface 16a of the inner surface of the vibration isolating base member 16 is held in face-to-face contact with the stepped surface 62d of the periphery of the partition member 62, it is also possible to increase the static spring constant without increasing the dynamic spring constant and to reduce the deflective deformation of the vibration isolating base 16 member and reduce the amount of creep, thereby improving the durability of the mount. Further, since it is possible with this embodiment to properly suppress the downward deflective deformation of the vibration isolating base member 16, even when the allotted amounts of the load differ among the mounts, the stopper clearance of each of the mounts is not affected thereby and the generation of hammering sounds can be prevented.

Figure 10:
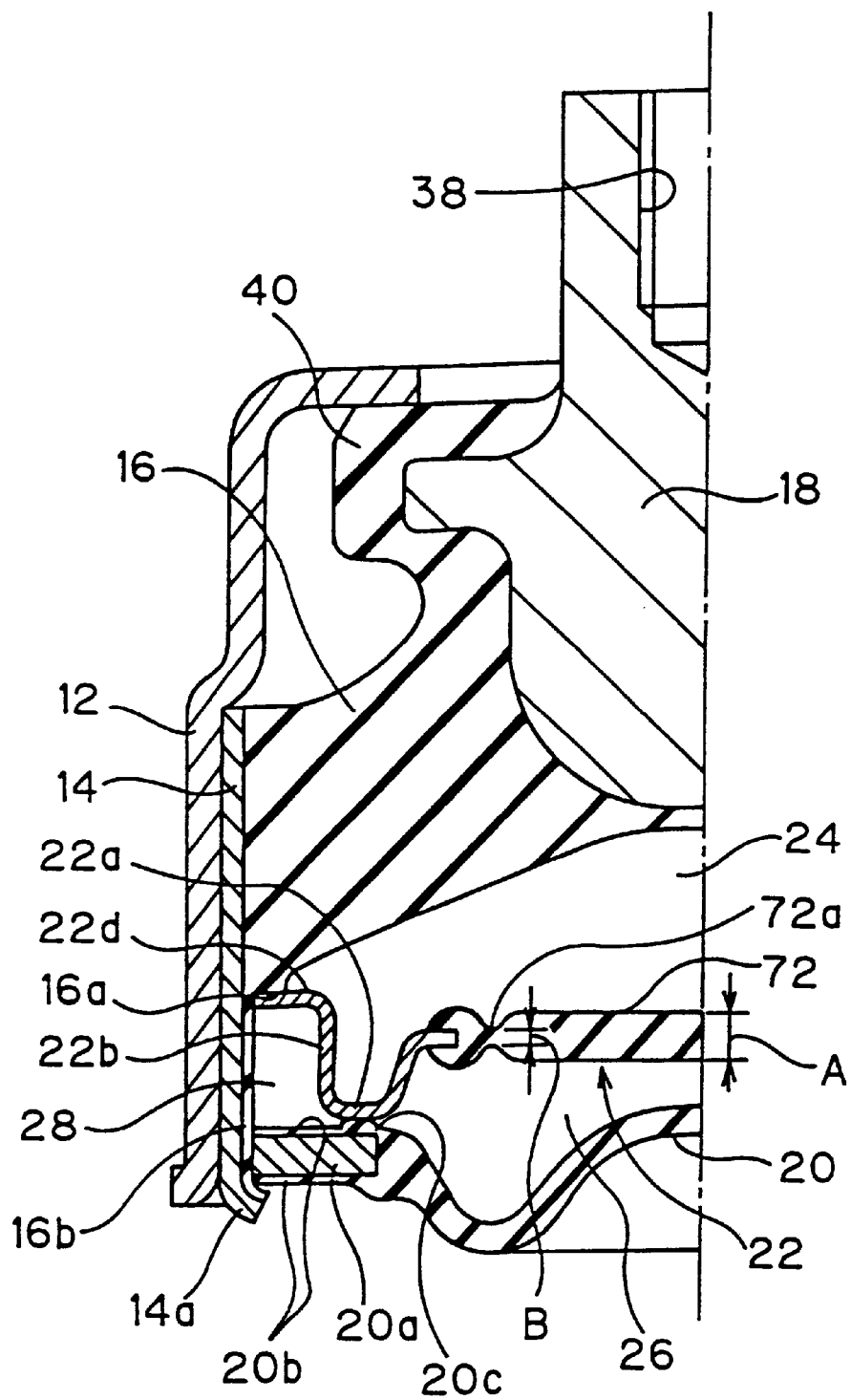
FIG. 10 is an enlarged partial vertical sectional view according to a fourth embodiment of the present invention.

FIG. 10 shows a liquid enclosing type vibration isolating mount 70 according to a fourth embodiment of the present invention. This embodiment is related to a combination of the first, second and third embodiments of the present invention. The difference of this embodiment from the first embodiment resides with the structure of the partition member 22 for defining the liquid chambers 24 and 26. Accordingly, the structure of the partition member 22 will be described while omitting the description of the other structures. Note that like parts are designated by like reference numerals throughout the drawings with respect to the first embodiment.

In this embodiment, the central partitioning portion of the partition member 22 of the first embodiment is substituted by a rubber membrane 72 so as to be elastically deformable. That is, the partition member 22 comprises a rigid portion including the communication path forming portion 22b and the contact portion 22a which are formed of a press worked metal plate and the rubber membrane 72 attached to the inner periphery of the rigid portion by a vulcanization molding means.

As shown in the figure, the rubber membrane 72 has an annular thin portion 72a, which is thinner than the inner part of the rubber membrane, in proximity to the portion at which the rubber membrane is attached to the rigid portion. That is, the thickness B of the thin portion 72a provided at the periphery of the rubber membrane 72 is made smaller than the general thickness A of the inner part of the rubber membrane 72 whereby the responsiveness of the rubber membrane 72 to vibration is enhanced.

Therefore, according to the vibration isolating mount 70 according to this embodiment, in addition to the effects obtained from the above-mentioned first embodiment, it is possible to reduce the dynamic spring constant in a high frequency domain over a wide frequency range of 100–500 Hz thereby reducing the generation of muffled sound or transmitting sound. In this case, to increase such effect, it is preferable that the thickness B of the thin portion 72a is one-fourth to four-fifth of the thickness A of the inner part of rubber membrane 72.

Figure 11:
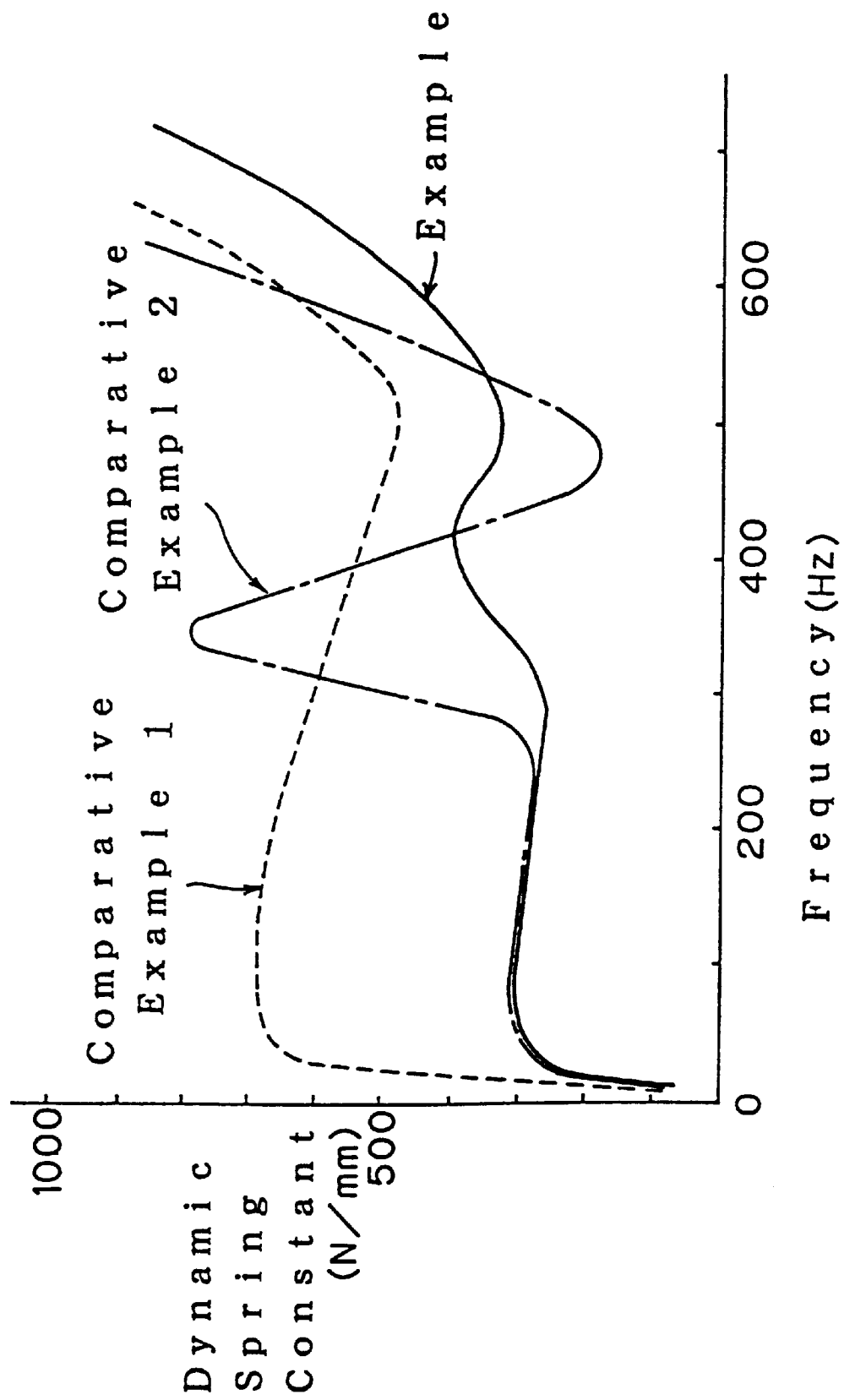
FIG. 11 is a graph showing a relationship between a frequency and a dynamic spring constant.
Figure 14:
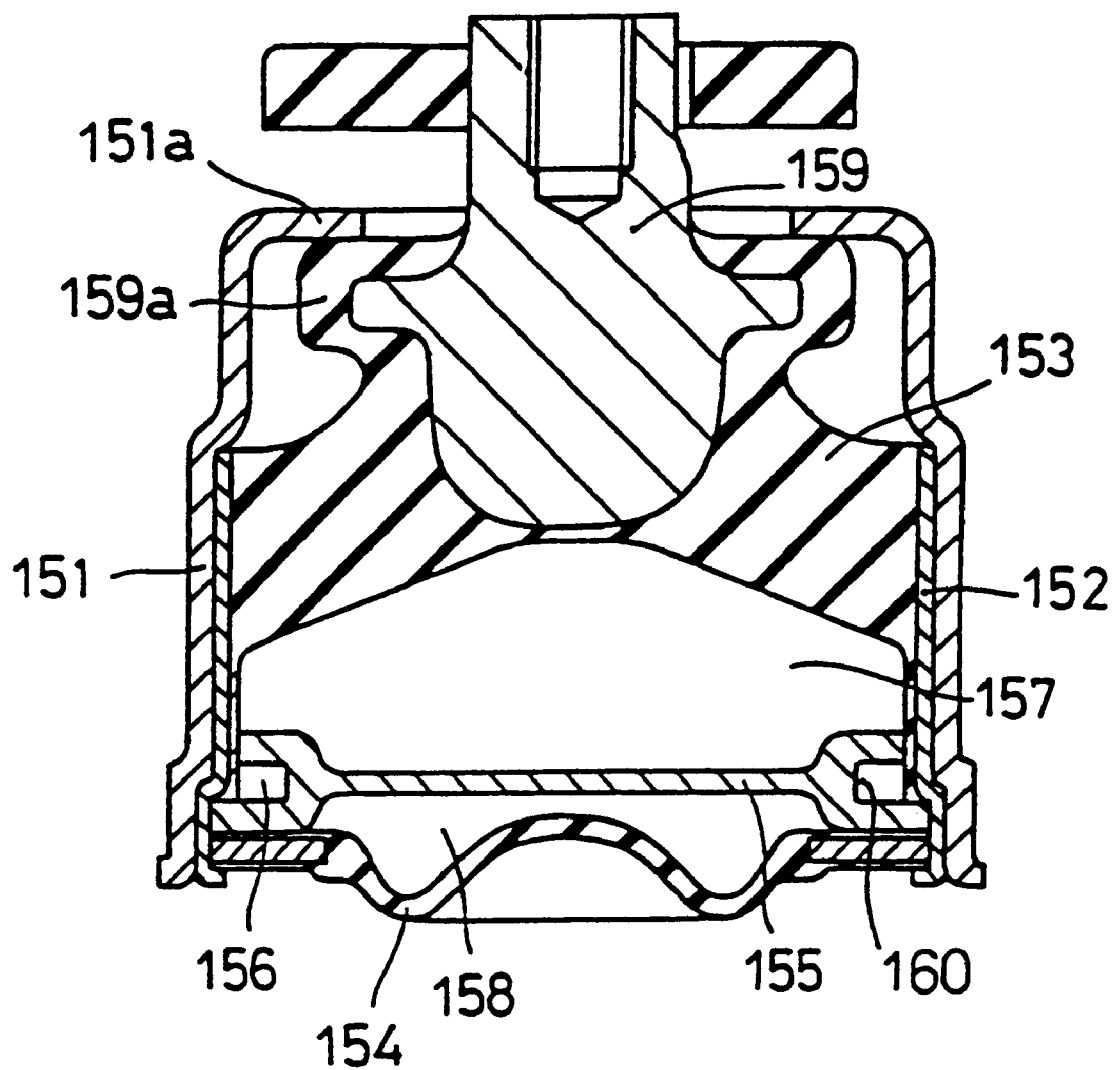
FIG. 14 is a conventional vibration isolating mount.
Figure 15:
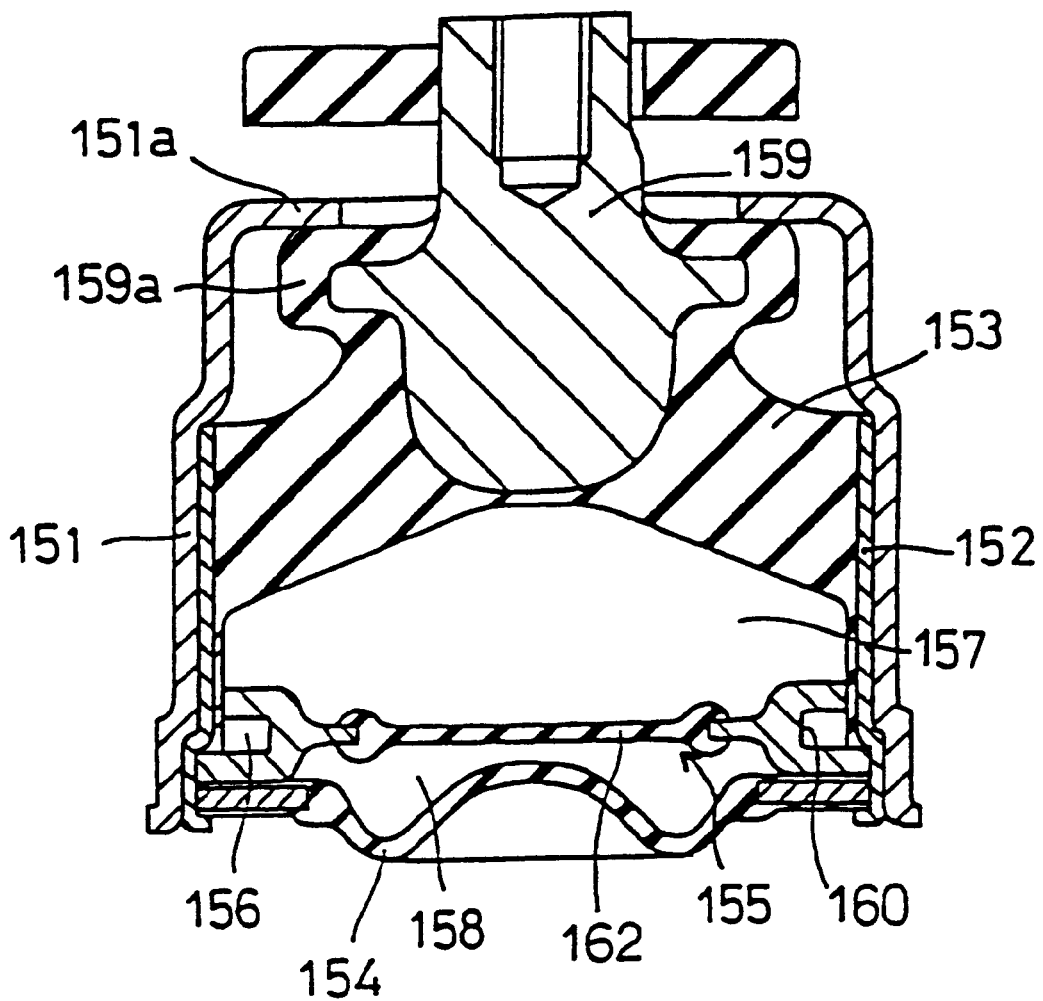
FIG. 15 is a vertical sectional view showing a state in which a rubber membrane is provided on a partition member of the conventional vibration isolating mount shown in FIG. 14.

In FIG. 11, there is shown a relationship between frequency and the dynamic spring constant of the vibration isolating mount 70. As will be clear from FIG. 11, in the case of a vibration isolating mount without a rubber membrane (Comparative example 1) shown in FIG. 14, the dynamic constant is high as a whole. On the other hand, in the case of a vibration isolating mount having a rubber membrane (Comparative example 2) shown in FIG. 15, the dynamic constant of the mount decreases in the frequency range of 100–300 Hz but it increases at a frequency around 350 Hz. In contrast, the vibration isolating mount 70 of the instant embodiment, the dynamic spring constant decreases over a wide frequency range of 100–500 Hz showing the effect of reducing the muffled sound or transmitting sound.

Figure 12:
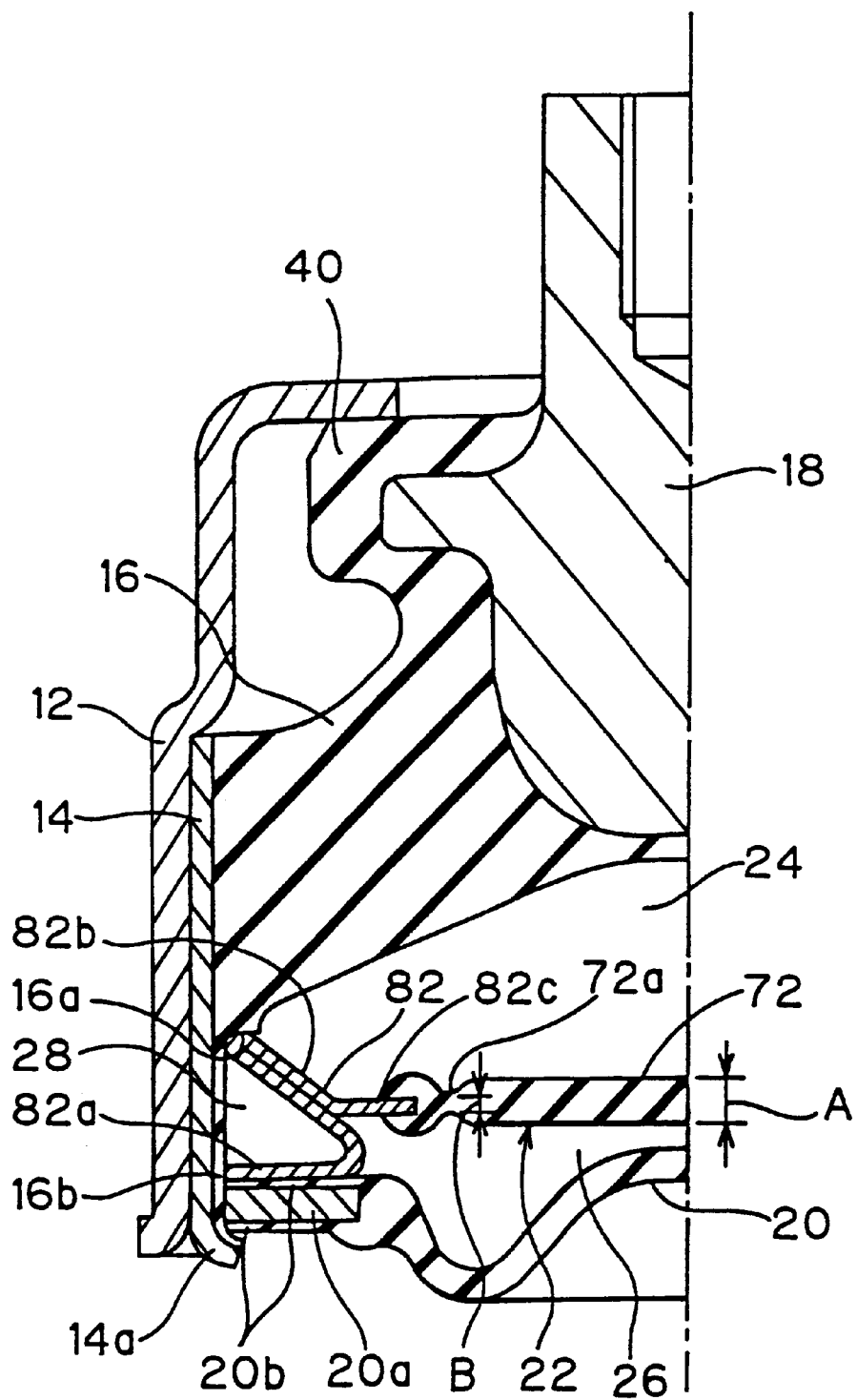
FIG. 12 is an enlarged partial sectional view of a liquid enclosing type vibration isolating mount according to a fifth embodiment of the present invention.

FIG. 12 shows a liquid enclosing type vibration isolating mount 80 according to a fifth embodiment of the present invention. This embodiment is related to the third aspect of the present invention wherein the rigid portion of the partition member 22 in the above-mentioned fourth embodiment is modified.

That is, in this embodiment, a rigid portion 82 of the partition member 22 is a press worked metal plate which includes an annular contact portion 82a contacting the peripheral portion of the diaphragm 20, a folded portion 82b formed as a portion extending upwardly and outwardly from the inner periphery of the contact portion 82a and folded back at the contact portion, and an extension 82c extended inwardly from the inner periphery of the folded portion b. Further, the orifice path 28 is formed by the contact portion 82a, the folded portion 82b and the inner surface of the cylindrical metal 14. In addition, the rubber membrane 72 is attached to the extension 82c.

In this embodiment, too, the thin portion 72a is formed at the periphery of the rubber membrane 72 of the partition member 22 so that it is possible to reduce the spring constant in a high frequency domain over a wide range of 100–500 Hz.

Figure 13:
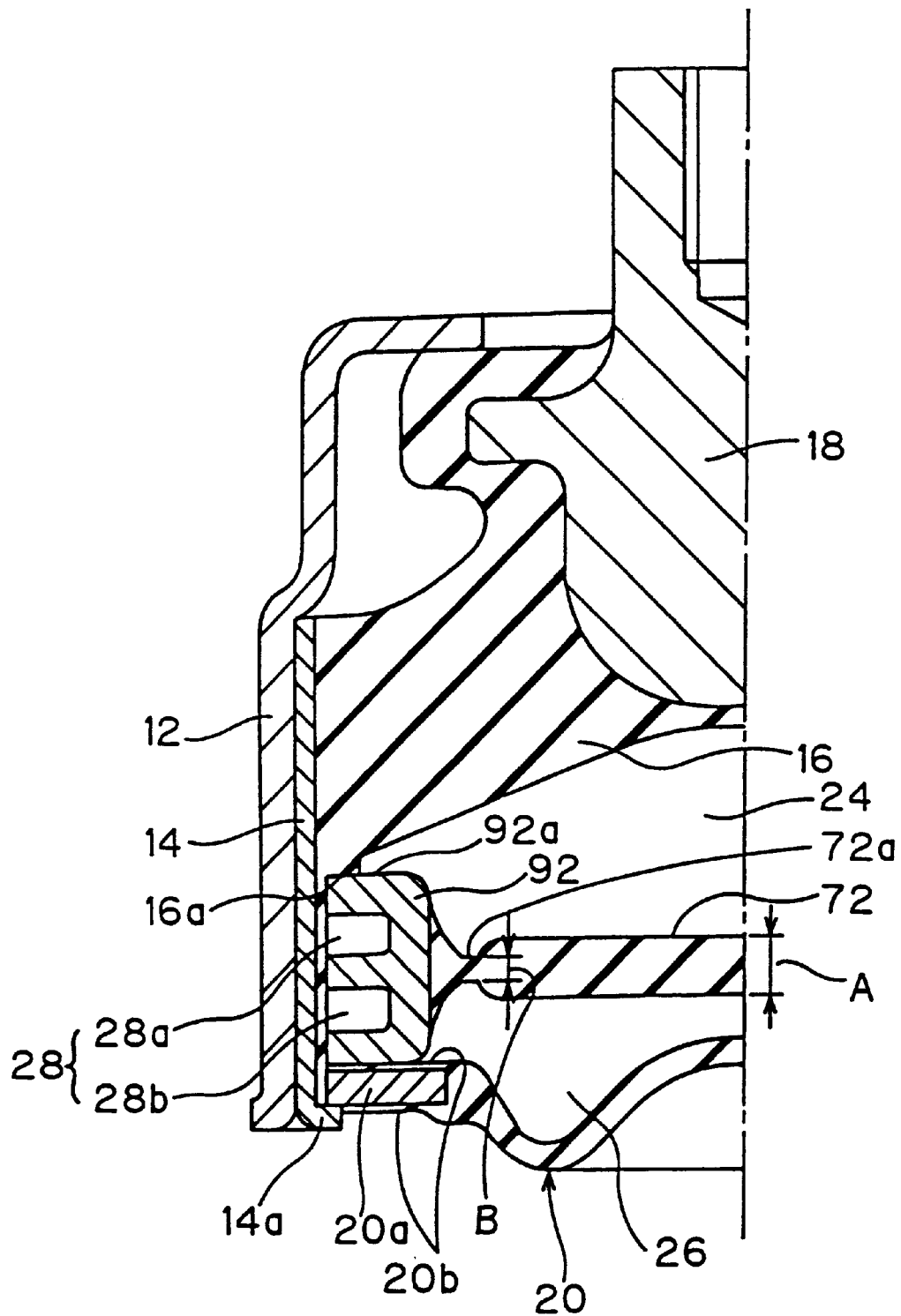
FIG. 13 is an enlarged partial vertical sectional view of a liquid enclosing type vibration isolating mount according to a sixth embodiment of the present invention.

FIG. 13 shows a liquid enclosing type vibration isolating mount 90 according a sixth embodiment of the present invention. This embodiment is related to the second and third aspects of the present invention wherein the rigid portion of the partition member in the forth embodiment is modified.

In this embodiment, a rigid portion 92 of the partition member 22 is made of a molded metal product and the rubber membrane 72 is directly attached to the inner peripheral surface of the rigid portion 92. The rigid portion 92 has an E-shaped section so as to provide two orifice paths 28a and 28b along the outer periphery thereof and the rubber membrane 72 is bonded to substantially the entire surface of the vertical inner peripheral wall thereof with the formation of the thin portion 72a at a portion somewhat inside the bonded portion of the rubber membrane 72. Note that reference numeral 92a designates the stepped surface of the partition member 22 which is held in contact with (but not bonded to) the stepped surface 16a of the inner surface of the vibration isolating base member 16.

Thus, by directly attaching the rubber membrane 72 of the partition member 22 to the inner peripheral surface of the rigid portion 92, a large area can be secured for the rubber member 72 as compared to the case of FIG. 9 in which the extension 62e is provided, whereby the responsiveness of the rubber membrane 72 to vibration is increased to further reduce the dynamic spring constant in a high frequency domain.

INDUSTRIAL APPLICABILITY

The liquid enclosing type vibration isolating mount according to the first aspect of the present invention has the advantages that the manufacturing cost is reduced, the axial length of the mount can be shortened and the partition member can be processed with ease.

The liquid enclosing type vibration isolating mount according to the second aspect of the present invention has the advantages that the static spring constant of the mount can be increased without increasing the dynamic spring constant thereof and the deflective deformation of the vibration isolating base member is minimized to reduce the amount of creeping resulting in improving the durability of the member. Especially, since the downward deflective deformation can be properly controlled, the stopper clearance is little affected even when a plurality of such mounts are used and the allotted amounts of the load differ among the mounts so that the generation of hammering sounds can be prevented.

The liquid enclosing type vibration isolating mount according to the third aspect of the present invention has the advantage that it is possible to reduce the dynamic spring constant in a high frequency domain over a wide range of 100–500 Hz.

What is claimed is:

1. A two chamber liquid enclosing type vibration isolating mount, comprising: in a sealed state, a cylindrical metal; a fixing metal; a vibration isolating base member made of rubber and coupling the cylindrical metal and the fixing metal; a diaphragm made of a first rubber membrane and arranged at an opening of the cylindrical metal opposing to the vibration isolating base member; a partition member arranged inside the diaphragm and dividing a space between the vibration isolating member and the diaphragm into two liquid chambers communicating with each other through an orifice path, wherein said partition member comprises an annular rigid portion for forming said orifice path along an outer periphery thereof and a second rubber membrane attached to the inside of said rigid portion and defining said two liquid chambers, and the thickness of a portion of said second rubber membrane close to an attached portion thereof is made thinner than an inner part of said second rubber membrane, an inner surface of said vibration isolating base member including a first stepped surface formed along a periphery thereof, the outer periphery of said partition member including a second stepped surface, said first stepped surface being held in contact with the second stepped surface of said partition member.

2. A liquid enclosing type vibration isolating mount according to claim 1, wherein an annular auxiliary metal is provided along a periphery of said diaphragm and is fixed to an inner periphery of the opening of said cylindrical metal in such a manner that it is held in pressure contact with the surface, opposing to said diaphragm, of the peripheral portion of said partition member.

3. A two chamber liquid enclosing type vibration isolating mount comprising: in a sealed state, a cylindrical metal; a fixing metal; a vibration isolating base member made of rubber and coupling the cylindrical metal and the fixing metal; a diaphragm made of a first rubber membrane and arranged at an opening of the cylindrical metal opposing to the vibration isolating base member; a partition member arranged inside the diaphragm and dividing a space between the vibration isolating member and the diaphragm into two liquid chambers communicating with each other through an orifice path, wherein said partition member comprises an annular rigid portion for forming said orifice path along an outer periphery thereof and a second rubber membrane attached to the inside of said rigid portion and defining said two liquid chambers, and the thickness of a portion of said second rubber membrane close to an attached portion thereof is made thinner than an inner part of said second rubber membrane, the rigid portion of said partition member coming into contact with a periphery of said diaphragm so that in cooperation with said diaphragm, said rigid portion forms said orifice path along the outer periphery of its contact portion with said diaphragm.

4. A two chamber liquid enclosing type vibration isolating mount, comprising: in a sealed state, a cylindrical metal; a fixing metal; a vibration isolating base member made of rubber and coupling the cylindrical metal and the fixing metal; a diaphragm made of a first rubber membrane and arranged at an opening of the cylindrical metal opposing to the vibration isolating base member; a partition member arranged inside the diaphragm and dividing a space between the vibration isolating member and the diaphragm into two liquid chambers communicating with each other through an orifice path, wherein said partition member comprises an annular rigid portion for forming said orifice path along an outer periphery thereof and a second rubber membrane attached to the inside of said rigid portion and defining said two liquid chambers, and the thickness of a portion of said second rubber membrane close to an attached portion thereof is made thinner than an inner part of said second rubber membrane, the rigid portion of said partition member being formed by press working of a metal plate, the rigid portion of said partition member coming into contact with a periphery of said diaphragm so that in cooperation with said diaphragm, said rigid portion forms said orifice path along the outer periphery of its contact portion with said diaphragm.

5. A two chamber liquid enclosing type vibration isolating mount comprising: in a sealed state, a cylindrical metal; a fixing metal; a vibration isolating base member made of rubber and coupling the cylindrical metal and the fixing metal; a diaphragm made of a first rubber membrane and arranged at an opening of the cylindrical metal opposing to the vibration isolating base member; a partition member arranged inside the diaphragm and dividing a space between the vibration isolating member and the diaphragm into two liquid chambers communicating with each other through an orifice path, wherein said partition member comprises an annular rigid portion for forming said orifice path along an outer periphery thereof and a second rubber membrane attached to the inside of said rigid portion and defining said two liquid chambers, and the thickness of a portion of said second rubber membrane close to an attached portion thereof is made thinner than an inner part of said second rubber membrane, said rigid portion of said partition member presenting a vertical inner peripheral surface, said second rubber membrane being bonded to a substantial portion of the vertical inner peripheral surface of the rigid portion of said partition member forming said orifice path.

6. A two chamber liquid enclosing type vibration isolating mount comprising: in a sealed state, a cylindrical metal, a fixing metal; a vibration isolating base member made of rubber and coupling the cylindrical metal and the fixing metal; a diaphragm made of a rubber membrane and arranged at an opening of the cylindrical metal opposing the vibration isolating base member; and a partition member arranged inside the diaphragm and dividing a space between the vibration isolating base member and the diaphragm into two liquid chambers communicating with each other through an orifice path, wherein a peripheral portion of an inner surface of said vibration isolating base member includes a first stepped surface, an outer periphery of said partition member including a second stepped surface opposing said vibration isolating base member, said first stepped surface being held in contact with said second stepped surface of said partition member.

7. A liquid enclosing type vibration isolating mount according to claim 6, wherein an annular auxiliary metal is provided along a periphery of said diaphragm and is fixed to an inner periphery of the opening of said cylindrical metal in such a manner that it is held in pressure contact with a surface, opposing to said diaphragm, of the peripheral portion of said partition member.

8. A two chamber liquid enclosing type vibration isolating mount comprising: in a sealed state, a cylindrical metal, a fixing metal; a vibration isolating base member made of rubber and coupling the cylindrical metal and the fixing metal; a diaphragm made of a rubber membrane and arranged at an opening of the cylindrical metal opposing the vibration isolating base member; and a partition member arranged inside the diaphragm and dividing a space between the vibration isolating base member and the diaphragm into two liquid chambers communicating with each other through an orifice path, wherein a peripheral portion of an inner surface of said vibration isolating base member is held in contact with a surface, opposing said vibration isolating base member, of a peripheral portion of said partition member, the rigid portion of said partition member coming into contact with a periphery of said diaphragm so that in cooperation with said diaphragm, said rigid portion forms said orifice path along the outer periphery of its contact portion with said diaphragm.

* * * * *